United States Patent
Anderegg et al.

(10) Patent No.: US 7,349,596 B2
(45) Date of Patent: Mar. 25, 2008

(54) SYSTEM AND METHOD TO REMOVE LIGHT FROM CLADDING

(75) Inventors: Jesse Anderegg, Layton, UT (US); Stephen John Brosnan, San Pedro, CA (US); Peter Anthony Thielen, Cerritos, CA (US)

(73) Assignee: Northrop Grumman Corporation, Los Angeles, CA (US)

( * ) Notice: Subject to any disclaimer, the term of this patent is extended or adjusted under 35 U.S.C. 154(b) by 1 day.

(21) Appl. No.: 11/376,924

(22) Filed: Mar. 16, 2006

(65) Prior Publication Data

US 2007/0217738 A1    Sep. 20, 2007

(51) Int. Cl.
    *G02B 6/26* (2006.01)
(52) U.S. Cl. .................. 385/29; 385/27; 385/31
(58) Field of Classification Search ............. None
    See application file for complete search history.

(56) References Cited

U.S. PATENT DOCUMENTS

| | | | |
|---|---|---|---|
| 4,462,699 A * | 7/1984 | Shaw et al. .................. 374/131 |
| 5,319,195 A * | 6/1994 | Jones et al. .................. 250/227.11 |
| 5,418,880 A | 5/1995 | Lewis et al. |
| 5,966,493 A * | 10/1999 | Wagoner et al. ............. 385/140 |
| 6,275,628 B1 * | 8/2001 | Jones et al. .................. 385/29 |
| 6,327,412 B1 | 12/2001 | Kakui et al. |
| 6,438,294 B1 | 8/2002 | Lauzon et al. |
| 6,865,316 B1 * | 3/2005 | Pratt ............................ 385/29 |
| 6,876,680 B2 | 4/2005 | Yoshida et al. |
| 2003/0086174 A1 | 5/2003 | Wakisaka et al. |
| 2004/0022495 A1 * | 2/2004 | Shapiro et al. ............... 385/48 |
| 2006/0204195 A1 * | 9/2006 | Kurosawa et al. .......... 385/125 |

* cited by examiner

*Primary Examiner*—Sung Pak
*Assistant Examiner*—Mike Stahl
(74) *Attorney, Agent, or Firm*—Tarolli, Sundheim, Covell & Tummino LLP

(57) ABSTRACT

A system to remove cladding light from an optical fiber that includes a core and a cladding that surrounds the core. A volume of an index-matching material contacts an exterior surface of the cladding along a contact length of the optical fiber. The index-matching material has a refractive index that substantially matches a refractive index of the cladding at a predetermined clamping temperature and has a refractive index with a negative temperature coefficient, such that the index matching material distributively removes light from the cladding along the contact length based on the temperature of the index matching material that contacts the cladding.

24 Claims, 3 Drawing Sheets

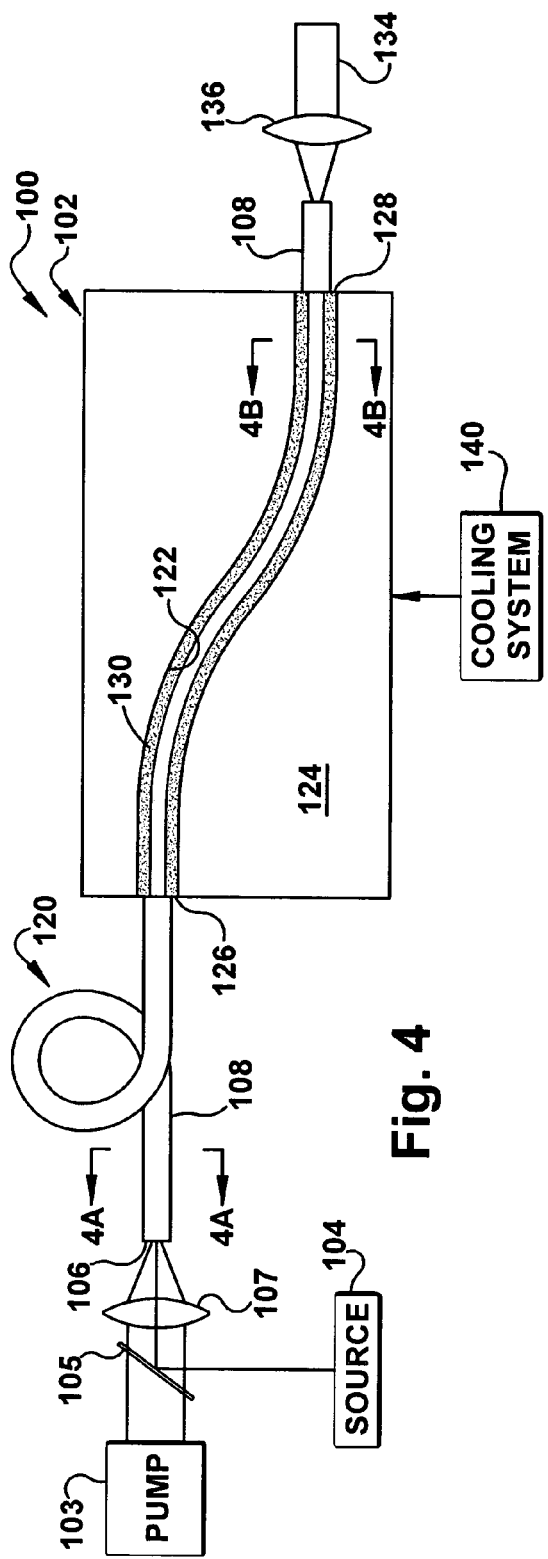
Fig. 4
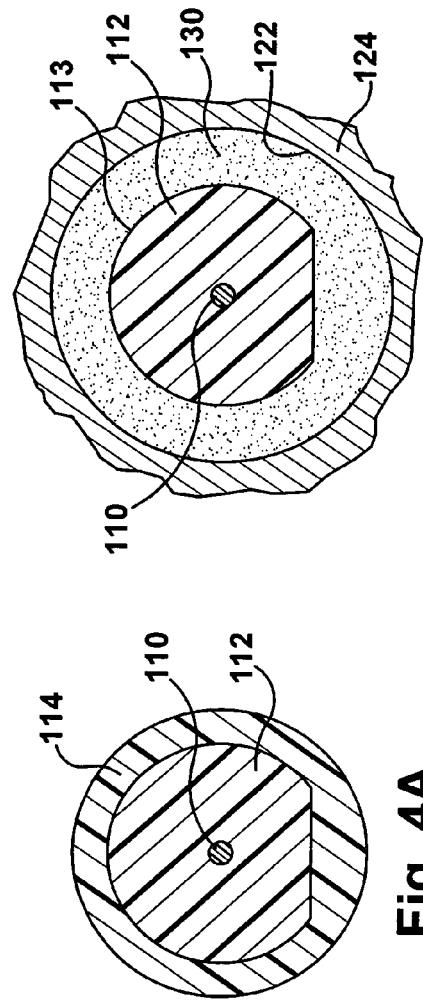
Fig. 4B
Fig. 4A

SYSTEM AND METHOD TO REMOVE LIGHT FROM CLADDING

TECHNICAL FIELD

This invention relates generally to optics, and more specifically to a system and method to remove light from cladding of an optical fiber.

BACKGROUND

An optical fiber (or fiber) is a special type of waveguide that is typically manufactured from glass, such as silica. A fiber includes a core that operates as a waveguide for the transmission of light. The core is surrounded by one or more layers of a medium, known as a cladding. Usually, the core is located at the center of the fiber surrounded by the cladding, although a fiber can be provided with an off-center core, such as in some double-clad fibers. Most fibers, including those used in laser optics, typically have a core with a refractive index that is higher than that of the cladding. The increased refractive index of the core can be obtained by doping the glass core with an index-raising material, such as germanium. The refractive index contrast between core and cladding determines the numerical aperture of the fiber.

A fiber amplifier typically includes a gain fiber having a core that includes rare-earth dopant ions. For example, the core of a fiber can be doped with laser-active ions, such as rare-earth ions of erbium, neodymium, ytterbium, or thulium. One or more laser diodes (or other pumping means) are coupled to the fiber to provide a pump signal to the fiber core. When optically pumped, the fiber exhibits gain over a wavelength region that is characteristic of the rare-earth dopant. The amplifier gain is related to the amount of pump power coupled to the gain fiber as well as to the length of the fiber.

Most fibers operate within expected parameters at low power levels, such as are employed for most telecommunications applications. As the power through an optical fiber increases, however, problems can develop which may decrease performance as well as damage the fiber and/or surrounding components. As one example, a significant amount of light may be guided in the cladding of the optical fiber, which can interfere with the signal in the core at the output of the fiber. One approach for separating the cladding light from the core light employs free-space filtering, where the output of the fiber is allowed to propagate in free space over many meters. The higher diverging cladding light spatially separates from the lower diverging core light the further the beam is allowed to propagate. This approach is good for measuring the raw power of the light from the fiber's core, but it usually is ineffective in sufficiently removing all cladding light from the core light thereby causing problems for more subtle applications. This approach also typically requires significant bench top space to implement.

SUMMARY

The present invention relates to a system and method to remove light from the cladding of an optical fiber.

One aspect of the present invention provides a system that includes an optical fiber having an elongated core surrounded by a cladding, the cladding having a lower refractive index relative to the core. A portion of the optical fiber extends through a chamber. An index-matching material is located within the chamber in contact with an exterior surface of the cladding. The index-matching material has a refractive index with a negative temperature coefficient, the index-matching material being operative to remove light from the cladding including if light in the cladding has an optical power greater than or equal to about five Watts.

Another aspect of the present invention provides a system to remove cladding light from an optical fiber. The optical fiber includes a double-clad fiber having an inner cladding that surrounds a core along the length of the fiber and an outer cladding that surrounds the inner cladding. The outer cladding is removed from the double-clad fiber to expose a portion of the inner cladding along a contact length of the optical fiber. A volume of an index-matching material contacts the exposed inner cladding along the contact length of the optical fiber. The index-matching material having a refractive index that substantially matches a refractive index of the inner cladding at a predetermined clamping temperature and having a refractive index with a negative temperature coefficient, such that the index matching material distributively removes light from the inner cladding along the contact length based on the temperature of the index matching material that contacts the cladding.

Another aspect of the present invention provides a system that includes elongated fiber means for propagating light in a direction through the fiber means. The fiber means includes a cladding layer that surrounds a core. At least some of the light propagating through the cladding as cladding light. The system also includes means for contacting an elongated sidewall of the cladding along a contact length of the elongated fiber means and for distributively removing cladding light from cladding along the contact length over a range of temperatures that is less than a predetermined clamping temperature. The means for contacting has a refractive index that substantially matches a refractive index of the cladding at the predetermined clamping temperature and has a refractive index with a negative temperature coefficient, such that the removal of light by the means for contacting varies based on the temperature of the means for contacting.

Still another aspect of the present invention provides a method for removing light from cladding of an optical fiber. The method includes disposing a length of the optical fiber within a volume of an index-matching material such that the index matching material contacts an exterior surface of the cladding along a contact length of the optical fiber. The index-matching material has a refractive index that substantially matches a refractive index of the cladding at a predetermined clamping temperature and has a refractive index with a negative temperature coefficient. Light is transmitted through the optical fiber at high power so that greater than about five Watts of power propagates through the cladding. Light is distributively removed from the cladding along the contact length based on the temperature of the index matching material that contacts the cladding. By distributively removing the cladding light, such as disclosed and claimed herein, thermal management of optical systems may be simplified.

BRIEF DESCRIPTION OF THE DRAWINGS

FIG. 4 depicts an example of a fiber amplifier implementing a system to remove cladding light in accordance with an aspect of the present invention.

FIG. 4A is a cross-sectional view taken along line 4A-4A in FIG. 4.

FIG. 4B is a cross-sectional view taken along line 4B-4B in FIG. 4.

DETAILED DESCRIPTION

In high power fiber optic systems, such as may include fiber amplifiers, fiber lasers, and fiber coupled diode lasers, a significant amount of light may be guided in the cladding of the optical fiber. A significant amount of cladding light thus can remain in the cladding so as to interfere with the output from the core. In certain circumstances, the cladding light can also be of a sufficient power level to heat the cladding, which can decrease performance and/or cause damage to the optical fiber. The present invention provides a mechanism to remove cladding light. As described herein, the systems and methods enable distributively removing light from the cladding in a way to mitigate thermal issues that would likely exist in traditional approaches.

As used herein, the term "high power" refers to at least one or more hundred watts and for many applications may mean one or more kilowatts. By way of example, lasers with high output powers are required for a number of applications, e.g., for material processing (welding, cutting, drilling, marking, surface modification), large-scale laser displays, military applications, particle acceleration, and laser-induced nuclear fusion. It will be understood that the present invention is not limited to lasers as it may be applied to other high power optical applications, such as fiber amplifiers and fiber coupled laser diodes.

Figure 1:
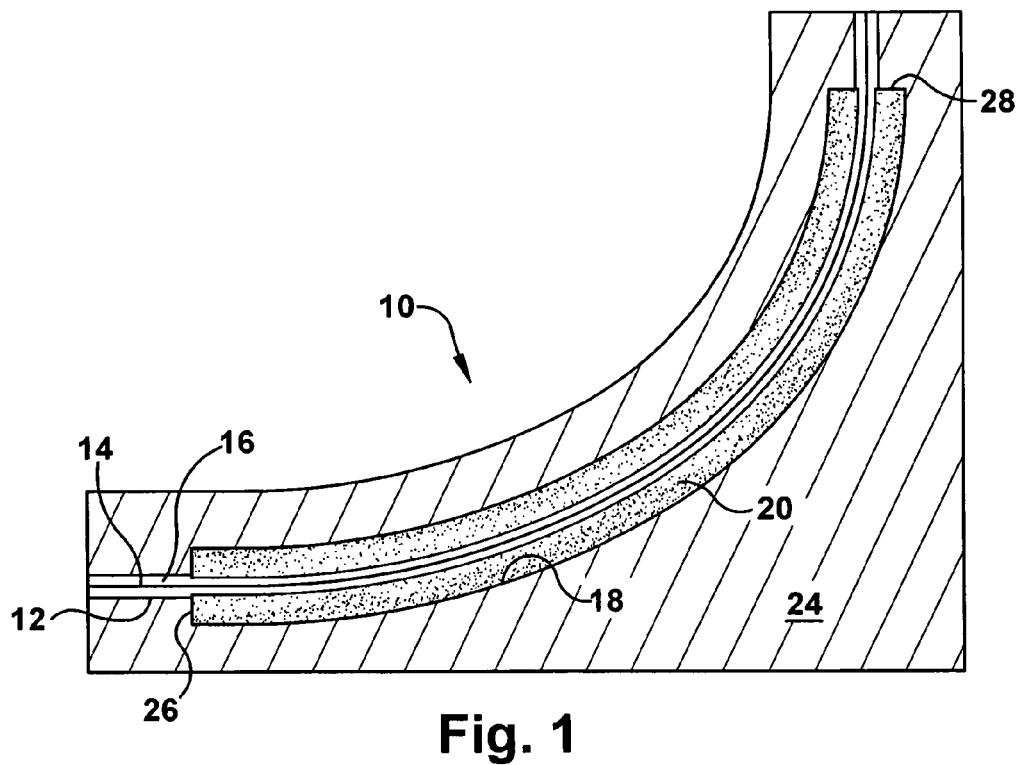
FIG. 1 depicts an example of a system to remove cladding light in accordance with an aspect of the present invention.

FIG. 1 depicts an example of a system 10 that can be utilized to remove light from cladding of an optical fiber 12 according to an aspect of the present invention. The optical fiber 12 includes an elongated core 14 that is surrounded by a cladding 16. The cladding 16 has a lower refractive index relative to the core 14. As used herein, the term "refractive index" refers to a property of a given optical medium corresponding to a measure of the velocity of light in the given medium. For example, the refractive index of a transparent optical medium is the factor by which the phase velocity is decreased relative to the velocity of light in vacuum, assuming linear propagation. The refractive index typically depends on the optical frequency or wavelength of the light propagating through the medium. The dependence on the wavelength is known as dispersion. As one example, the wavelength of light propagating through the core (the core light) can provide a numerical aperture that is less than about 0.08 (e.g., in a range from about 0.06 to about 0.07).

A volume of an index matching material 20 contacts an exterior surface of the cladding 16 along an intermediate length of the optical fiber 12. In the system 10, a length of the optical fiber 12 extends through an elongated chamber 18. The chamber 18 contains a volume of the index matching material 20 that contacts an exterior surface of the cladding 16. In the example of FIG. 1, the chamber 18 is implemented as an elongated path that extends between spaced apart ends 26 and 28 within a housing 24. For example, the chamber can be a channel or groove formed into one side of the housing or it may be implemented as cylindrical path bored through the housing. The light propagates through the optical fiber 12 in the direction from the input end 26 to the output end 28 of the chamber 18. The chamber 18 can be implemented as a curved cylindrical channel that exhibits a 90° arc along its length, such as depicted in FIG. 1. The sweep of the arc is not limited to a 90° arc, as one or more other angles, which may be greater than or less than 90°, can also be utilized to provide a desired curved contour for the chamber 18. The chamber 18 and the optical fiber 12 therein might also include more than one curved section having multiple arcs that curve in one or more different directions (see, e.g., FIG. 2). The optical fiber 12 can extend longitudinally through a center of the chamber 18 along a path having a contour that is commensurate with the chamber 18. The length of the chamber 18 between the ends 26 and 28 can vary according to the power requirements and space requirements for the system 10. It will be also understood that the chamber 18 is not limited to a constant cross-sectional diameter along its length, as other shapes can be used. Additionally the chamber 18 can be fluidly coupled with one or more reservoirs (e.g., a beam dump) to help direct light out-coupled from the cladding away from the fiber, such that power is absorbed over a larger area.

The index-matching material 20 has a negative refractive index thermal coefficient. As used herein, as applied to the refractive index of the index-matching material 20, the term "negative thermal coefficient" describes a property by which the refractive index of the index-matching material decreases with increasing temperature. Another property of the index matching material 20 may be that the index-matching material tends to absorb power somewhat at a desired wavelength (or range of wavelengths). If the index matching material 20 absorbs power at a given wavelength (propagating through the cladding 16, the temperature of such material increases as power is dumped into the index matching material. Consequently, due to the negative refractive index thermal coefficient of the index-matching material 20, the refractive index of the index-matching material will decrease as a function of increasing temperature, as occur when power is absorbed by the index-matching material.

The index matching material 20 can be provided to have a known refractive index that substantially matches the refractive index of the cladding 16 at a predetermined clamping temperature. At or above the predetermined clamping temperature, the refractive index of the index-matching material 20 will drop below the refractive index of the cladding 16. When the refractive index of the index-matching material 20 drops below the refractive index of the cladding 16, a corresponding increase in total internal reflection (TIR) of light within the cladding 16 occurs. The increase in TIR within the cladding 16 (due to the relative contrast in refractive indices between the index matching material 20 and the cladding, e.g., $N_{IND\_MATCHING\_MATERIAL} < N_{CLADDING}$) limits the amount of cladding light that is stripped or removed from the cladding. Thus, for the situation when the temperature of a localized region of the index matching material 20 is sufficiently elevated above the predetermined clamping temperature, the index matching material in that region has stripped the maximum amount of light possible and further directs the surplus cladding light downstream to be stripped by a cooler region within the index matching material 20.

The predetermined clamping temperature can be established according to optical and thermal properties of the cladding and the index matching material. As an example, assuming that the optical fiber 12 is a step index fiber (e.g., having a substantially constant refractive index in the core) having a fused silica cladding 16 surrounding the core 14, the predetermined clamping temperature can be about 50° C.

Continuing with this example, the refractive index of the index matching material 20 is higher than the cladding 16 for temperatures below 50° C. so that the index-matching material can remove light from the cladding at any temperature below 50° C. By providing the index-matching material to have such a property relative to the cladding, the system 10 can maintain its ability to remove light from the cladding even when the index matching material 20 is at a higher temperature relative to many existing systems. As a result of the index-matching material 20 being at a higher temperature relative to existing approaches and still able to strip light from the cladding 16 of the fiber 12, more power from the cladding can be stripped and dumped into the index-matching material 20 relative to many existing approaches.

By way of example, the index-matching material 20 can be a liquid, gel, an adhesive (e.g., epoxy) or other type of material that is chosen such that its refractive index substantially matches the refractive index of the cladding (e.g. fused silica) 20 at the predetermined clamping temperature. As one example, the index-matching material 20 can be an index-matching liquid that is a composition of aliphatic and alicyclic hydrocarbons, such as is available commercially from Cargille Laboratories, Inc., of Cedar Grove, N.J. (e.g., sold as fused silica matching liquid). Those skilled in the art will understand and appreciate other index-matching materials that can be utilized, such as may be available from Cargille Laboratories, Inc., from Norland Products of Cranbury, N.J., and from LuxLink of Hicksville, N.Y., to name a few.

As discussed above, as the temperature of the index-matching material 20 within the chamber 14 rises above the predetermined clamping temperature in response to the propagation of light through the optical fiber 12, the index-matching material will (at some point) reach a maximum capacity for stripping cladding light and will direct the remaining excess cladding light downstream, where it can be stripped by the downstream (cooler region) of the index-matching material 20. For example, during initial operation when the amplified light propagates through the core 14 and some light remains in the cladding, a section of the index matching material 20 proximal the input end 26 will remove light from the cladding 16 and begin to heat up. This establishes a temperature gradient in which the temperature of the index-matching material 20 near the input end 26 is greater than the temperature of the index-matching material near the output end 28. As the section of index-matching material 20 proximal the end 26 heats up to a temperature that is greater than or equal to the predetermined clamping temperature, the light-stripping ability of such index-matching material (proximal the input end 26) will decrease until some light continues to propagate downstream through the cladding beyond such section. The light that is not stripped from the cladding will continue to propagate through the cladding farther along the length of the optical fiber 12 to a distal section of the index matching material that is cooler. The cooler index matching material 20 has a refractive index that is at least equal to the refractive index of the cladding 16. At such location, the light will be stripped from the cladding into the index matching material. This light stripping characteristic continues along the length of the chamber 14 such that the index-matching material substantially self-regulates the amount of light stripped in any one location to approximate the predetermined clamping temperature. As a result, the system 10 allows a large amount of power to be distributively removed from the optical fiber 12 within the chamber 18 so that no one section experiences an excessive heat load.

To help mitigate heating of the index-matching material 20, the chamber 18 can be implemented in a thermally conductive housing (e.g., copper or aluminum) 24. The housing 24 affords heat transfer from the index-matching material 20 to the housing via conduction (by contact between the index-matching material and the interior of the chamber 18, which is part of the housing. The housing 24 can further transfer heat by employing a cooling system (not shown). The cooling system may be passive or active. For instance, a passive system radiates heat from one or more surfaces of the housing 24 whereas an active system employs additional equipment (e.g., cooling plate, running water, fans, etc.) to implement cooling of the housing 24. Those skilled in the art will understand and appreciate various types and configurations of cooling systems that can be utilized, which can vary according to the application in which the system 10 is being implemented.

Figure 2:
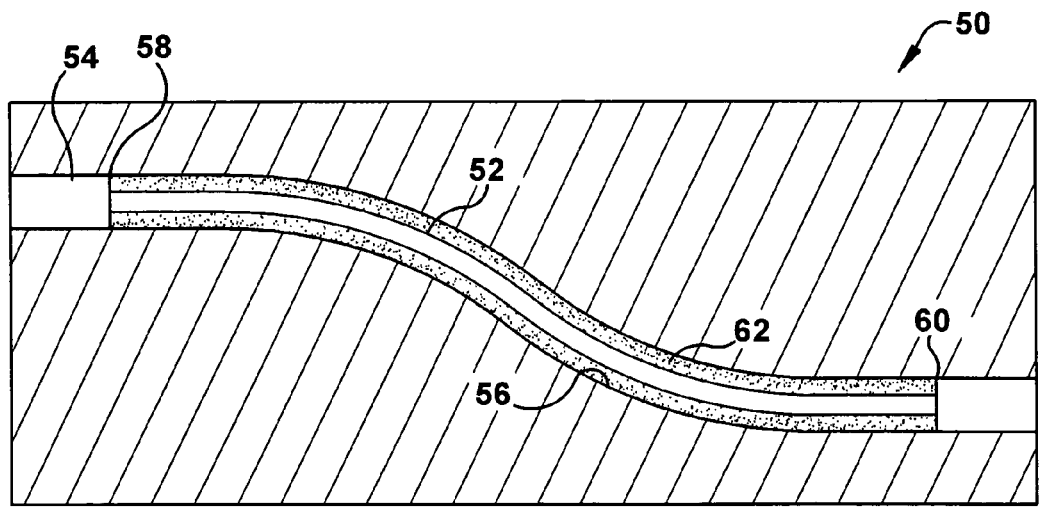
FIG. 2 depicts another example of a system to remove cladding light in accordance with an aspect of the present invention.

FIG. 2 depicts another example of a system 50 that can be utilized to remove light from cladding 52 of an optical fiber 54 according to an aspect of the present invention. The system 50 includes a curved chamber 56 that extends between respective ends 58 and 60 of the chamber. A volume of index-matching material 62 is contained within the chamber 56. An exterior surface of a cladding 52 of the fiber 54 located between the respective ends 58 and 60 of the chamber 56 is in contact with the index matching material 62. Those skilled in the art will understand and appreciate various types of optical fibers that can be utilized based upon the description contained herein. Additionally, those skilled in the art will understand various types of index matching materials and properties thereof that can be employed to remove cladding light from the fiber 54.

In the example of FIG. 2, the chamber 56 is configured to have a substantially S-shaped between the respective ends 58 and 60. For example, the fiber 54 extends from the end 58 along a substantially linear path for a predetermined distance then curves in a first direction transverse to the initial linear direction and gradually curves back in a second direction (substantially opposite the first direction) towards the original linear direction such that the portion of the chamber proximal of the end 58 and end 60 are substantially parallel. This chamber configuration can provide a space-saving alternative to the configuration of FIG. 1. It is to be understood and appreciated that the respective end portions of the chamber 56 need not be substantially parallel. Moreover, the length of the chamber 56 may be generally linear and still realize a cladding light removal function, although (with all parameters being equal) a curved shape typically should exhibit improved light removal performance relative to a substantially straight chamber path. The principles of operation associated with the removal of cladding light from the optical fiber 54 by the system 50 of FIG. 2 are substantially the same as that shown and described with respect to FIG. 1. Accordingly, a description of the distributive cladding light removal characteristics and associated self-regulating thermal characteristics of the index-matching material during operation are not repeated here.

Figure 3:
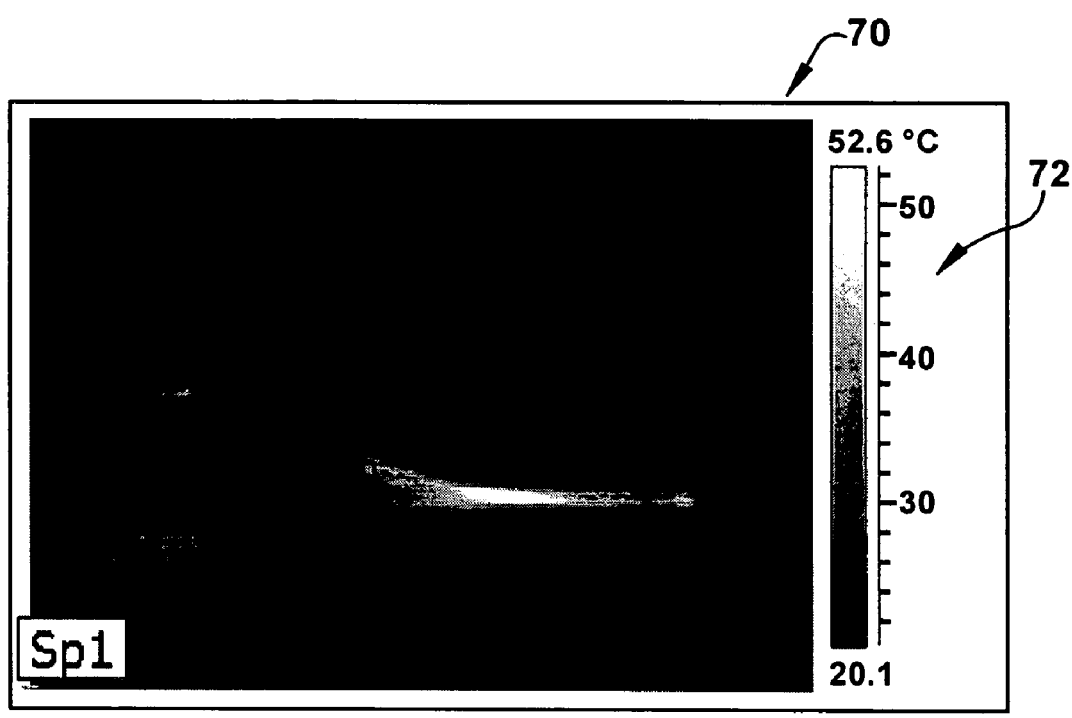
FIG. 3 depicts an example of a thermal image of the system of FIG. 2 during operation.

FIG. 3 depicts one example of a thermal image 70 during operation of the system 50 of FIG. 2. From the temperature scale 72, the image 70 demonstrates that the temperature is being clamped to a predetermined clamping temperature near about 50° C. As discussed above with respect to FIG. 1, the predetermined clamping temperature can be set by manufacturing the index-matching material to have a refractive index that is substantially equal to the refractive index of the cladding at about the predetermined clamping temperature. In this way, cladding light can be distributively removed along the length of the fiber within the chamber, so as to provide little or no cladding light at a downstream optical output. FIG. 3 further demonstrates that as more power is dumped into the index-matching material that surrounds the fiber, there is an increasing thermal region that extends farther along the length of the fiber. Thus, after the index matching material reaches the predetermined clamping temperature, a substantially steady state condition can be achieved during operation.

FIG. 4 depicts an example of a fiber amplifier 100 that can implement a cladding light removal system 102 according to an aspect of the present invention. In the example of FIG. 4, the cladding light removal system 102 is depicted as the same type and configuration of system shown and described with respect to FIG. 2. It will be understood, however, that the fiber amplifier 100 (or other types of optical system) is not limited to such a system configuration. Those skilled in the art will understand and appreciate various types of configurations of systems for removing cladding light that can be implemented based on the teachings contained herein.

In the example of FIG. 4, a pump 103 supplies pumping light to an input face 106 of an optical fiber 108. Those skilled in the art will understand and appreciate various types of optical pumping mechanisms (e.g., laser diode for end or side pumping) that can be utilized to supply pumping light to the optical fiber 108. A source (e.g., a laser source) 104 provides another light signal that is combined with the pumping light by a combiner or optical coupler 105. In the example of FIG. 4, the combiner 105 provides the combined optical signal through an optical system 107. The optical system 107 can include an arrangement of one or more lenses. The optical system 107 focuses the combined light (e.g., from the pump 103 and the signal source 104) to the input face 106 of the optical fiber 108. Alternatively, side pumping can be used to supply pumping light. The wavelength of pumping light and the input signal to be amplified can be selected according to the dopant in the core 110 of the optical fiber 108. For example, for an ytterbium doped fiber, the pump 103 may supply light at a wavelength of about 975 nm and the source 104 can supply light at a wavelength of about 1064 nm, which is amplified by the amplifier 100.

By way of example, and not limitation, the optical fiber 108 can be implemented as a double clad fiber, such as shown in the cross-sectional view of FIG. 4A. The double clad fiber includes a core 110 that extends substantially through the center of an inner cladding 112 that is surrounded by an outer cladding 114. The inner cladding 112 has a lower refractive index relative to the refractive index of the core 110. Relative refractive indices of the core 110 and the inner cladding 112 define the numerical aperture of the optical fiber 108. As one example, the optical fiber has a low numerical aperture, such as less than about 0.08 (e.g., in a range between 0.06 and 0.07). The optical fiber 108 can propagate light through the core in a single mode or multimode, generally depending upon design considerations and the intended application of the fiber amplifier system 100. As an example, for applications where high beam quality is desired, the core 110 will usually be implemented as a single mode core.

The outer cladding 114 can be a coating of a suitable material (e.g., a polymer) having a lower refractive index than the inner cladding 112. The outer cladding 114 has a lower refractive index relative to the inner cladding 112 to restrict the pumping light to the inner cladding 112 and the core 110. Thus, in the example of FIG. 4, the optical system 105 focuses the pumping light to the core 110 and the inner cladding 112, known as cladding pumping of the optical fiber 108.

As shown in example of FIG. 4A, the inner cladding 112 may have a substantially D-shaped cross-sectional shape, which facilitates the absorption of pumping light from the inner cladding to the core 110. It is to be understood and appreciated that the amplifier system 100 is not limited to use of an optical fiber having a D-shaped cladding, as the cladding may have a different cross-sectional shape, such as circular, hexagonal, octagonal, elliptical, or star-shaped. By way of further example, the core 110 can have a 20 micrometer diameter with the cladding having approximately a 400 micrometer diameter. Those skilled in the art will appreciate that other respective diameters of the core and cladding can be utilized depending upon the application and power specifications in which the system 100 is to be utilized.

The system 100 includes an amplifier 120 that is utilized to amplify the power within the core 110. In the example of FIG. 4, the amplifier 120 can be implemented by doping the core with a rare-earth ion (e.g., erbium, neodymium, ytterbium, or thulium). Additionally, the amplifier 120 may optionally include one or more coils in the optical fiber for amplifying the signal light input to the optical fiber 108 by the pump 104. As the pumping light propagates through the inner cladding, the pumping light is absorbed to amplify the signal light along the length of the amplifier 120. The length of the amplifier and the configuration can vary according to the amount of amplification. As mentioned herein, after amplification by the amplifier 120, some cladding light may remain within the inner cladding. For high-power applications, the power associated with the cladding light may be equal to or greater than about 5 Watts.

The optical fiber 108 extends into and through the cladding light removal system 102. The amplifier 120 thus provides the amplified signal in the optical fiber 108 to the cladding light removal system 102 to strip excess cladding light. The system 102 includes a chamber 122 that extends through a housing 124, such as a thermally conductive material (e.g., copper or aluminum or thermally conductive resin). In the example of FIG. 4, the chamber 122 is implemented as a substantially S-shaped channel that extends between respective ends 126 and 128, such a shown and described with respect to FIG. 3. The chamber 122 is not limited to such a shape and configuration.

The optical fiber extends through the chamber 122. At least a substantial portion of the optical fiber 108 that resides within the chamber 122 has its outer cladding 114 removed such that an exterior surface of the exposed inner cladding 112 is in contact with an index matching material 130 disposed within the chamber. Those skilled in the art will understand and appreciate various types and properties of a corresponding index matching material (e.g., liquid, gel, adhesive) that can be utilized based on the teachings contained herein. A cross-sectional view within the housing 124 is shown in FIG. 4B. Thus, in FIG. 4B, an exterior surface 113 of the inner cladding 112 contacts the surrounding index matching material 130. The volume of the index matching material 130 can be determined by the amount of space in the chamber 122 and the size of the inner cladding 112 that extends longitudinally through the chamber.

As discussed herein, the index matching material 130 has a refractive index that is substantially equal to the refractive index of the inner cladding 112 at a predetermined clamping temperature. Additionally, the index-matching material 130 has a negative temperature coefficient such that the index-matching material can remove light from the inner cladding 112 for a range of temperatures that is less than or equal to the predetermined clamping temperature. For example, the index-matching material 130 can be made to substantially match the refractive index of the inner cladding (e.g., fused silica) at about 50° C. As the temperature of the index-matching material 130 exceeds the predetermined clamping temperature, the refractive index of the index-matching material drops below the refractive index of the inner cladding 112 resulting in increased total internal reflection within the inner cladding. The transition between the relative refractive indices corresponds to reaching a maximum cladding light stripping capacity for such region of index-matching material. While a portion of the index-matching material 130 is above the predetermined clamping temperature, excess cladding light will not be removed, such that the material can cool below the clamping temperature and thereby regain its ability to remove cladding light. The temperature-clamping property of the index-matching material 130 further allows the power to be removed distributively over the length of the optical fiber 108 that resides within the chamber 122, thereby mitigating thermal problems. This also results in a self-regulating function in which the temperature is maintained at about the predetermined clamping temperature during extended operation. As discussed herein, by setting the clamping temperature sufficiently high, the index matching material 130 can remove the cladding light even if the cladding 112 has an optical power greater than or equal to about five Watts.

The optical fiber extends from the output end 128 of the cladding light removal system 102 to provide an output signal 134 that is substantially free of cladding light. For example, the output portion of the optical fiber 108 can transmit the signal from the core 110 through an associated optical system 136 to provide the corresponding output signal. The output signal 134 can be utilized for a given application.

The system 100 can also include a cooling system 140 for helping to cool the index-matching material 130. For instance, the cooling system can be connected with or integrated into the housing 124 and configured to help cool the housing 124 so as to facilitate heat transfer from (and thereby cooling) the index-matching material 130. By cooling the index-matching material 130, the cladding light removal function can be enhanced since there is an increased likelihood that the refractive index of the index-matching material will be greater than or equal to the refractive index of the inner cladding 112. The operation and cooling function implemented by the cooling system 140 may be passive or active, such as described herein. Those skilled in the art will understand and appreciate various types and configurations of cooling systems that can be utilized, which can vary according to the application and size requirements for the system 100.

What have been described above are examples of the present invention. It is, of course, not possible to describe every conceivable combination of components or methodologies for purposes of describing the present invention, but one of ordinary skill in the art will recognize that many further combinations and permutations of the present invention are possible. Accordingly, the present invention is intended to embrace all such alterations, modifications, and variations that fall within the spirit and scope of the appended claims.

What is claimed is:

1. A system comprising:
   an optical fiber having an elongated core surrounded by a cladding, the cladding having a lower refractive index relative to the core;
   an elongated chamber through which a portion of the optical fiber extends; and
   an index-matching material located within the chamber that is in contact with and substantially surrounding an exterior surface along an elongated length of the cladding, the index-matching material having a refractive index with a negative temperature coefficient, the index-matching material being operative to remove light from the cladding including if light in the cladding has an optical power greater than or equal to about five Watts.

2. The system of claim 1, wherein the optical fiber comprises a double-clad fiber in which the cladding is an inner cladding that surrounds the core along the length of the fiber, the double-clad fiber further comprises an outer cladding surrounds the inner cladding, the outer cladding having a lower refractive index relative to the inner cladding, the outer cladding being removed from the double-clad fiber along at least a substantial portion of the optical fiber to expose the inner cladding within the chamber such that the exposed inner cladding within the chamber contacts the index matching material.

3. The system of claim 1, wherein the optical fiber comprises a single mode fiber.

4. The system of claim 1, wherein the refractive index of the index-matching material has a negative thermal coefficient that causes the refractive index of the index-matching material to decrease below the index of refraction of the cladding if the temperature of the index-matching material exceeds a predetermined clamping temperature.

5. The system of claim 4, wherein the predetermined clamping temperature is defined as a function of the wavelength of light that propagates through the optical fiber and thermal characteristics of the optical fiber.

6. The system of claim 5, wherein the predetermined clamping temperature is about 50° C.

7. The system of claim 4, wherein the negative thermal coefficient of the index matching material enables the index matching material to remove light from the cladding distributively along the elongated length of the cladding according to the temperature of the index matching material in contact with the cladding.

8. The system of claim 1, wherein the refractive index of the index-matching material has a negative thermal coefficient and the refractive index of the index-matching material is set to substantially match the refractive index of the cladding at a predetermined clamping temperature, so that the refractive index of the index-matching material self-regulates removal of light from the cladding based on the predetermined clamping temperature.

9. The system of claim 8, wherein the predetermined clamping temperature is about 50° C.

10. The system of claim 1, wherein the elongated chamber and the optical fiber therein extend along a curved path.

11. The system of claim 10, wherein the curved path is substantially S-shaped.

12. The system of claim 1, wherein the index-matching material comprises an index-matching liquid.

13. The system of claim 1, further comprising a pump that provides light to the core at a given wavelength, the index matching material having a refractive index that exceeds the refractive index of the cladding at temperature that exceeds 25° C. for the given wavelength.

14. A system to remove cladding light from an optical fiber, the system comprising:

the optical fiber comprising a double-clad fiber having an inner cladding that surrounds a core along the length of the fiber and an outer cladding that surrounds the inner cladding, the outer cladding being removed from the double-clad fiber to expose a portion of the inner cladding along a contact length of the optical fiber;

a volume of an index-matching material that contacts the exposed inner cladding along the contact length of the optical fiber, the index-matching material having a refractive index that substantially matches a refractive index of the inner cladding at a predetermined clamping temperature and having a refractive index with a negative temperature coefficient, such that the index matching material distributively removes light from the inner cladding along the contact length based on the temperature of the index matching material that contacts the cladding.

15. The system of claim 14, wherein the refractive index of the index-matching material is operative to remove cladding light when greater than about five Watts of power propagates through the inner cladding.

16. The system of claim 14, wherein the predetermined clamping temperature is defined as a function of the wavelength of light that propagates through the optical fiber and thermal characteristics of the fiber.

17. The system of claim 16, wherein the predetermined clamping temperature is about 50° C.

18. The system of claim 14, wherein the volume of index-matching material resides in a chamber, a length of the optical fiber extending through the chamber such that at least a substantial portion of the inner cladding along the length of the optical fiber contacts the index matching material.

19. The system of claim 18, wherein the length of the optical fiber extending through the chamber extends along curved path.

20. The system of claim 14, wherein the index-matching material comprises a volume of a liquid.

21. The system of claim 14, further comprising:

a pump that provides pumping light to an input of the optical fiber at a given wavelength, the index matching material having a refractive index that exceeds the refractive index of the inner cladding at temperatures that exceed 25° C. for the given wavelength, and above the predetermined clamping temperature, the refractive index falls below the refractive index of the inner cladding; and an amplifier that amplifies the input light, the amplified light propagating through the optical fiber that extends through the volume of index-matching material, such that cladding light is removed from the inner cladding by the index-matching material based on the temperature of the index-matching material.

22. A system comprising:

elongated fiber means for propagating light in a direction through the fiber means, the fiber means comprising a cladding layer that surrounds a core, at least some of the light propagating through the cladding as cladding light with greater than or equal to about five Watts of power in the cladding; and means for contacting an elongated sidewall of the cladding along a contact length of the elongated fiber means and for distributively removing cladding light from cladding along the contact length over a range of temperatures that is less than a predetermined clamping temperature, the means for contacting having a refractive index that substantially matches a refractive index of the cladding at the predetermined clamping temperature and having a refractive index with a negative temperature coefficient, such that the removal of light by the means for contacting varies based on the temperature of the means for contacting.

23. A method for removing light from cladding of an optical fiber, the method comprising:

disposing a length of the optical fiber within a volume of an index-matching material such that the index matching material contacts an exterior surface of the cladding along a contact length of the optical fiber, the index-matching material having a refractive index that substantially matches a refractive index of the cladding at a predetermined clamping temperature and having a refractive index with a negative temperature coefficient;

transmitting light through the optical fiber at high power so that greater than about five Watts of power propagates through the cladding;

distributively removing light from the cladding along the contact length based on the temperature of the index matching material that contacts the cladding.

24. The method of claim 23, further comprising providing a chamber that contains the volume of index-matching material, and the optical fiber that resides in the chamber having a curved path.

* * * * *